(12) United States Patent
Han

(10) Patent No.: US 7,481,566 B2
(45) Date of Patent: Jan. 27, 2009

(54) LIGHT EMITTING DIODE BACKLIGHT UNIT AND LIQUID CRYSTAL DISPLAY HAVING THE SAME

(75) Inventor: Jeong Hun Han, Siheung-si (KR)

(73) Assignee: LG. Display Co., Ltd, Seoul (KR)

( * ) Notice: Subject to any disclaimer, the term of this patent is extended or adjusted under 35 U.S.C. 154(b) by 0 days.

(21) Appl. No.: 11/524,816

(22) Filed: Sep. 21, 2006

(65) Prior Publication Data

US 2007/0223248 A1 Sep. 27, 2007

(30) Foreign Application Priority Data

Mar. 27, 2006 (KR) .................... 10-2006-0027238

(51) Int. Cl.
*F21V 8/00* (2006.01)

(52) U.S. Cl. .................. 362/621; 362/612; 362/610; 362/342; 362/346; 362/608

(58) Field of Classification Search .............. 362/606, 362/612, 608–610, 621, 623, 625, 632–634, 362/244–245, 607, 622, 342, 346; 349/64–67; 385/146–147
See application file for complete search history.

(56) References Cited

U.S. PATENT DOCUMENTS

| | | | | |
|---|---|---|---|---|
| 2,398,624 A | | 4/1946 | Decker | |
| 5,381,309 A | * | 1/1995 | Borchardt | 362/612 |
| 5,839,823 A | | 11/1998 | Hou et al. | |
| 6,814,456 B1 | * | 11/2004 | Huang et al. | 362/30 |
| 6,988,813 B2 | * | 1/2006 | Hoelen et al. | 362/601 |
| 7,063,450 B2 | * | 6/2006 | Ehara et al. | 362/621 |
| 7,218,830 B2 | * | 5/2007 | Iimura | 385/146 |
| 2006/0109684 A1 | * | 5/2006 | Nesterenko et al. | 362/610 |

FOREIGN PATENT DOCUMENTS

| | | |
|---|---|---|
| DE | 10 2004 006 005 | 7/2005 |
| DE | 10 2005 056 646 | 10/2006 |

OTHER PUBLICATIONS

Office Action for corresponding German Patent Application Serial No. 10 2006 048 207.7-51, dated Oct. 24, 2007.

* cited by examiner

*Primary Examiner*—Jong-Suk (James) Lee
*Assistant Examiner*—Robert May
(74) *Attorney, Agent, or Firm*—Brinks Hofer Hofer & Lione

(57) ABSTRACT

A backlight unit and a liquid crystal display having the backlight are provided. The backlight unit includes a plurality of light emitting diode (LED) chips, a light guide plate for converting light generated from the LED chips into surface light, and a plurality of optical guide modules corresponding to the respective LED chips and disposed between the LED chips and the light guide plate.

15 Claims, 13 Drawing Sheets

LIGHT EMITTING DIODE BACKLIGHT UNIT AND LIQUID CRYSTAL DISPLAY HAVING THE SAME

PRIORITY CLAIM

The present disclosure claims priority to Korean Application No. 27238/2006, filed on Mar. 27, 2006, which is herein expressly incorporated by reference in its entirety.

BACKGROUND

1. Technical Field

The present disclosure relates to a light emitting diode (LED) backlight unit, and more particularly, to a backlight unit that can uniformly emit light from LEDs to a light guide plate and a liquid crystal display having the backlight unit.

2. Description of the Related Art

A liquid crystal display (LCD) device is a flat display device for displaying an image, and has been widely utilized as a monitor for a computer, a television set or the like, because of its advantage of thin profile, light weight and low power consumption. The LCD device typically includes a liquid crystal panel for displaying an image and a backlight assembly for emitting light to the liquid crystal panel.

The backlight assembly may be classified into an edge-type and a direct-type according to the disposition of a light source. The edge-type backlight assembly includes a light guiding plate and a light source disposed on a side surface of the light guiding plate. The light guiding plate serves to guide light emitted from the light source frontward. The direct-type backlight assembly is suitable for a large-sized (e.g., more than 12-inch) LCD device, and includes a plurality of light sources formed on a rear surface of the liquid crystal panel. The light emitted from the light sources is directly emitted to the liquid crystal panel.

The light source of the backlight assembly may be selected from any one of an electro luminescence (EL), a cold cathode fluorescent lamp (CCFL), a hot cathode fluorescent lamp (HCFL), and a light emitting diode (LED). The LEDs include red, green and blue LEDs and also white LEDs. Since the LEDs have the advantage of maintaining the uniformity of the light while reducing a thickness of the LCD device, the LEDs can contribute to a high luminance backlight assembly.

FIG. 1 is an exploded perspective view illustrating an edge-type LCD device having LEDs, and FIG. 2 is a top view illustrating luminance of the LCD device of FIG. 1 according to the related art. As shown in FIGS. 1 and 2, the related art edge-type LCD device includes a liquid crystal panel 10, and a backlight assembly 20 that emits light to the liquid crystal panel 10.

Referring to FIG. 1, the backlight assembly 20 includes a bottom cover 90, a reflective plate 70, a light guiding plate 50, a plurality of optical sheets 30, and a plurality of LEDs 60. The LEDs 60 are disposed at a side of the bottom cover 90 and spaced apart from each other. The backlight assembly 20 further includes a printed circuit board (PCB) 61 provided with an electric conductive pattern to supply electric power to the LEDs 60, and a housing 62 enclosing the LEDs 60 to guide the light generated from the LEDs 60 to the light guiding plate 50.

Referring to FIG. 2, the LEDs 60 and the light guiding plate 50 are disposed on an identical plane such that the light generated from the LEDs 60 is incident on a side surface of the light guiding plate 50. Moreover, the LEDs 60 have an emission angle of about 100°, and thus the light emitted from the LEDs 60 is incident on the incident surface of the light guiding plate 50. Due to the medium difference at the incident surface of the light guiding plate 50, the light path is changed.

However, in the related art LCD, the emission angle of the light emitted from the LEDs 60 and incident on the incident surface of the light guiding plate is reduced by the medium difference. As a result, bright portions A and dark portions B are alternately generated at the incident surface area of the light guiding plate 50, causing hot spots where the luminance is not uniform at areas where the LEDs 60 are disposed.

BRIEF SUMMARY

A backlight unit includes a plurality of LED (light emitting diode) chips; a light guide plate for converting light generated from the LED chips into surface light; and a plurality of optical guide modules corresponding to the respective LED chips and disposed between the LED chips and the light guide plate.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate the disclosure and together with the description serve to explain the principle of the disclosure. In the drawings.

DETAILED DESCRIPTION

Reference will now be made in detail to the accompanying drawings. Wherever possible, the same reference numbers will be used throughout the drawings to refer to the same or like parts.

Figure 1:
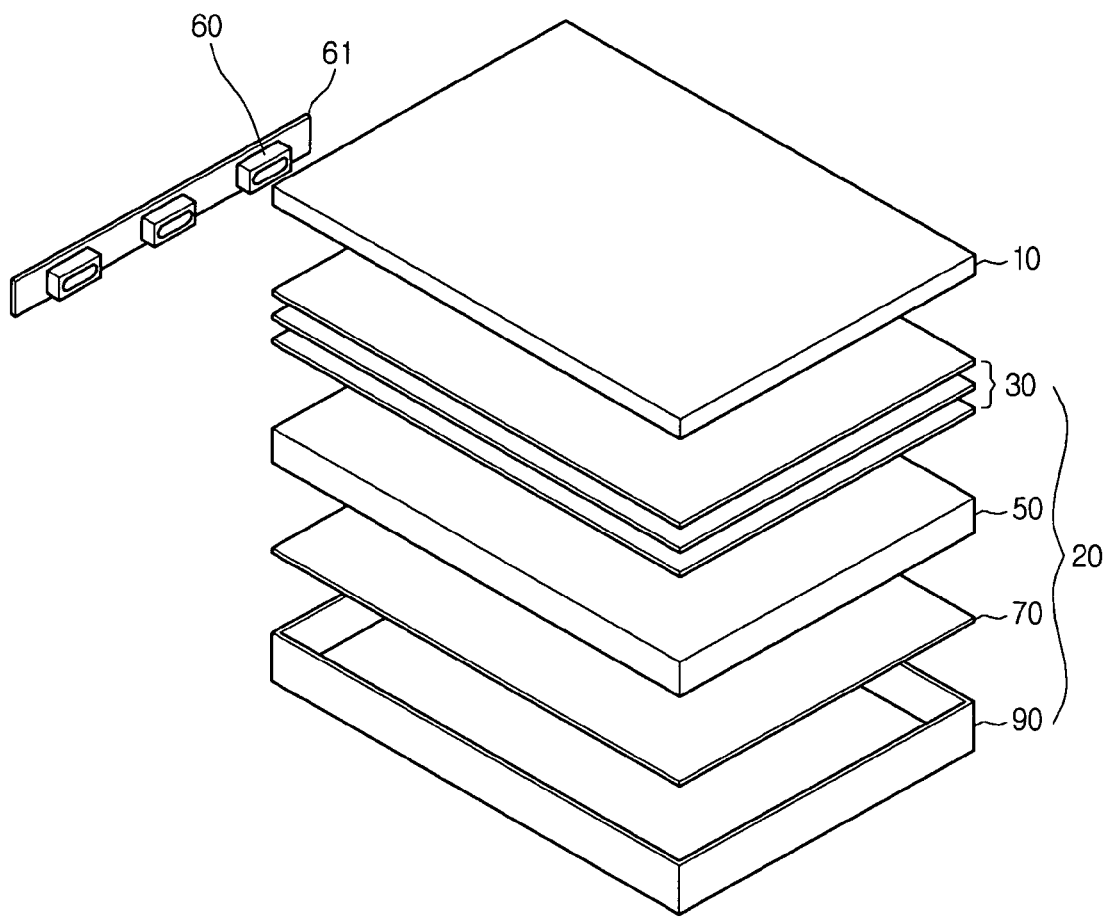
FIG. 1 is a view of a conventional backlight unit.
Figure 2:
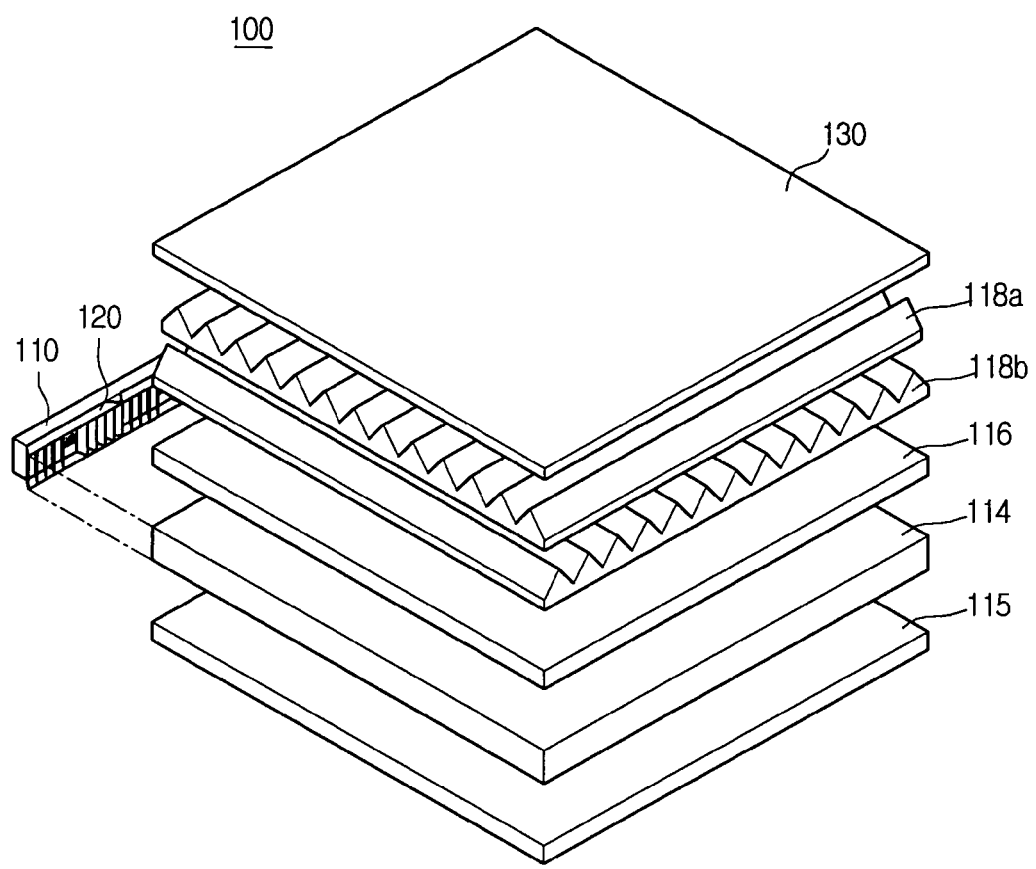
FIG. 2 is a view of an LCD device.

FIG. 2 is a view of an LCD device. As shown in FIG. 2, an LCD device 100 includes a display panel 130 displaying an image and a backlight unit emitting light toward the display panel 130.

The backlight unit includes LED chips (see FIG. 4) disposed at a side of a light guide plate 114 to emit light, a circuit board 110 for supplying electric power to the LED chip, an optical guide module 120 disposed between the light guide plate 114 and the LED chip to guide the light, a reflective plate 115 disposed under the light guide plate 114, a diffuser plate 116 disposed above the light guide plate 114, and vertical and horizontal prism sheets 118a and 118b disposed above the light guide plate 114.

The reflective plate 115 functions to reflect upward light leaking downward from the light guide plate 114. The diffuser plate 116 and the vertical and horizontal prism sheets 118a and 118b function to diffuse and compensate for surface light generated from the light guide plate 114.

Figure 3:
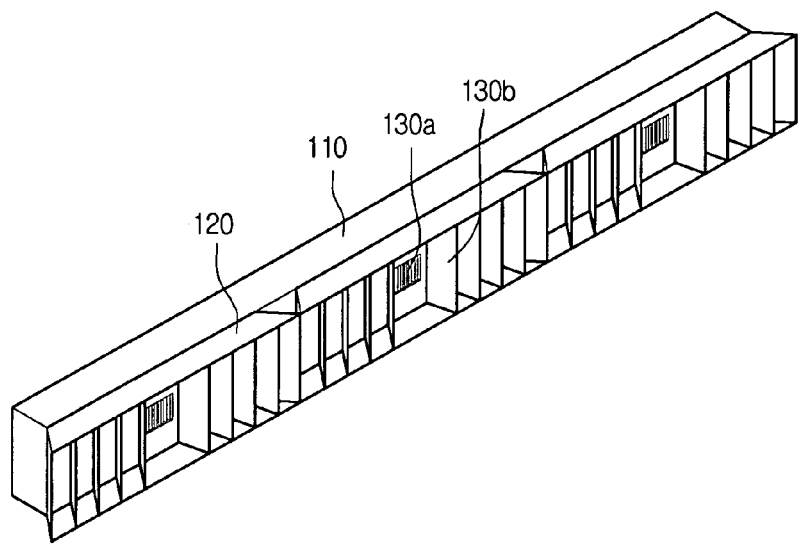
FIG. 3 is a view of an optical guide module and a circuit board of LED chips.

FIG. 3 is a view of the optical guide module and the circuit board for the LED chips. As shown in FIG. 3, a plurality of LED chips (not shown) are arranged on a circuit board 110 at determined intervals. The optical guide module 120 is disposed around each of the LED chips to uniformly guide the light emitted from the LED chip.

The optical guide modules 120 are adjacent to each other. Each of the optical guide modules 120 includes a plurality of light scattering elements, such as a plurality of slit bar 130a and a plurality of louver plates 130b. The LED chips are disposed at an inside area of the slit bar 130a. In this disclosure, scattering can include diffracting, reflecting, transmitting, and scattering the light generated from the LED chip 111.

Therefore, the light generated by LED chips is guided to an external side of the slit bar 130a and the louver plates 130b. Therefore, the light loss is reduced and thus the deterioration of the luminance and light spots can be prevented.

When the optical guide modules 120 does not contact each other, an optical reflective member or an optical dispersion member may be attached on the circuit board 110 between the LED chips to reduce the light loss.

Figure 4:
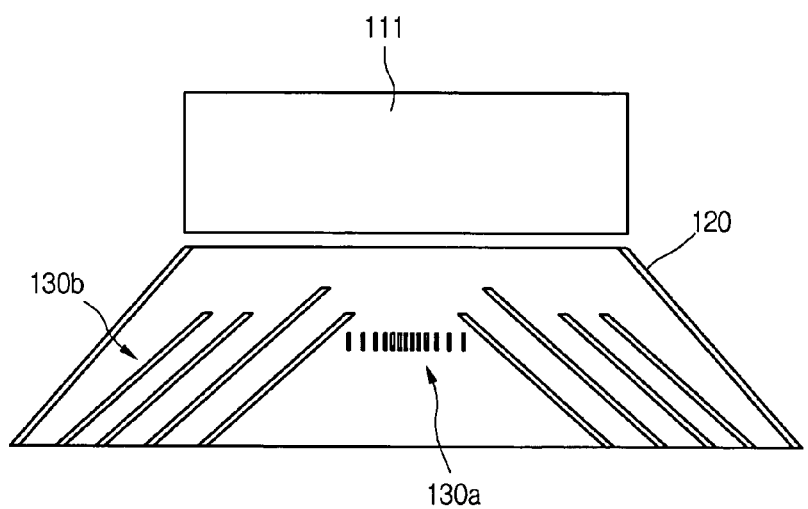
FIG. 4 is a view of an optical guide module of a backlight unit.

FIG. 4 is a view of an optical guide module of a backlight unit. As shown in FIG. 4, the LED chip 111 generating light is coupled to the optical guide module 120. The LED chip 111 may comprise blue LEDs on which phosphor is deposited to emit white light or may comprise red, green and blue LEDs to emit white light formed by mixing the red, green and blue lights.

The slit bar 130a and the louver plates 130b are arranged inside the optical guide module 120 to guide the light to a predetermined region by scattering the light.

The slit bar 130a having have a cross-section formed in a triangular-shape, a circular-shape, or a square-shape. In addition, the slit bar 130a diffract, reflect, scatter, and disperse the light generated from the LED chip 111 to prevent the light spot.

The slit bar 130a disposed in the optical guide module 120 are placed in front of the LED chip 111 to diffract, reflect and scatter the light generated from a central area of the LED chips 111. The slit bar 130a at the area corresponding to the center of the LED chip 111 are closely spaced apart from each other to disperse and scatter the strong light generated from the center of the LED chip 111. The slit bar 130a at the area corresponding to both side edges of the LED chip 111 are widely spaced apart from each other so that the light diffraction, reflection and scattering rates can be relatively low for the light generated from the side edges of the LED chip 111.

Therefore, the uniform luminance can be realized throughout overall area of the optical guide module 120.

In addition, the louver plates 130b disposed inside the optical guide module 120 are symmetrical with reference to the slit bar 130a.

The second louver plates 130b with reference to the slit bar 130a (i.e., from the centerline of the optical guide module 120) are longer than others. This arrangement serves to uniformly disperse the light generated from the central area of the LED chip 111 towards both side edges of the optical guide module 120.

Therefore, if the light generated from the central area of the LED chip 111 can be more uniformly dispersed toward the both side edges of the optical guide module 120, the longer louver plates may be further provided. For example, with reference to the slit bar 130a, the first and second louver plates 130b may be longer than others. Alternatively, the first, second and third louver plates may be longer than others.

In the drawings, although the number of louver plates at each side of the optical guide module 120 is four, other arrangements may be possible.

The louver plates 130b and slit bar 130a reflect, scatter and diffract the light generated from the LED chip 111 so that the light cannot be directly incident on the light guide plate. Therefore, since the light must be mixed to have a uniform luminance property in the optical guide module 120, the inner surface of the optical guide module may be formed of a highly reflective material to prevent the light loss. Likewise, the slit bar 130a and the louver plates 130b are also formed of the high reflective material.

Figure 5A:
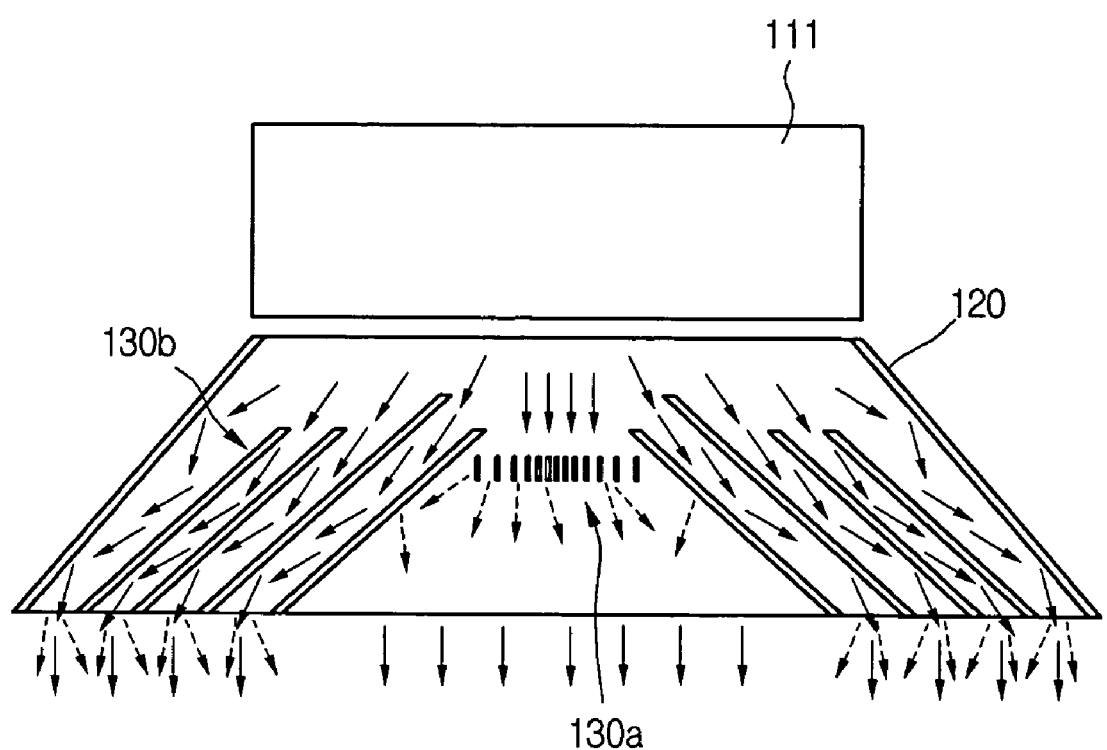
FIG. 5A is a view illustrating the traveling of light generated from an LED chip through an optical guide module.
Figure 5B:
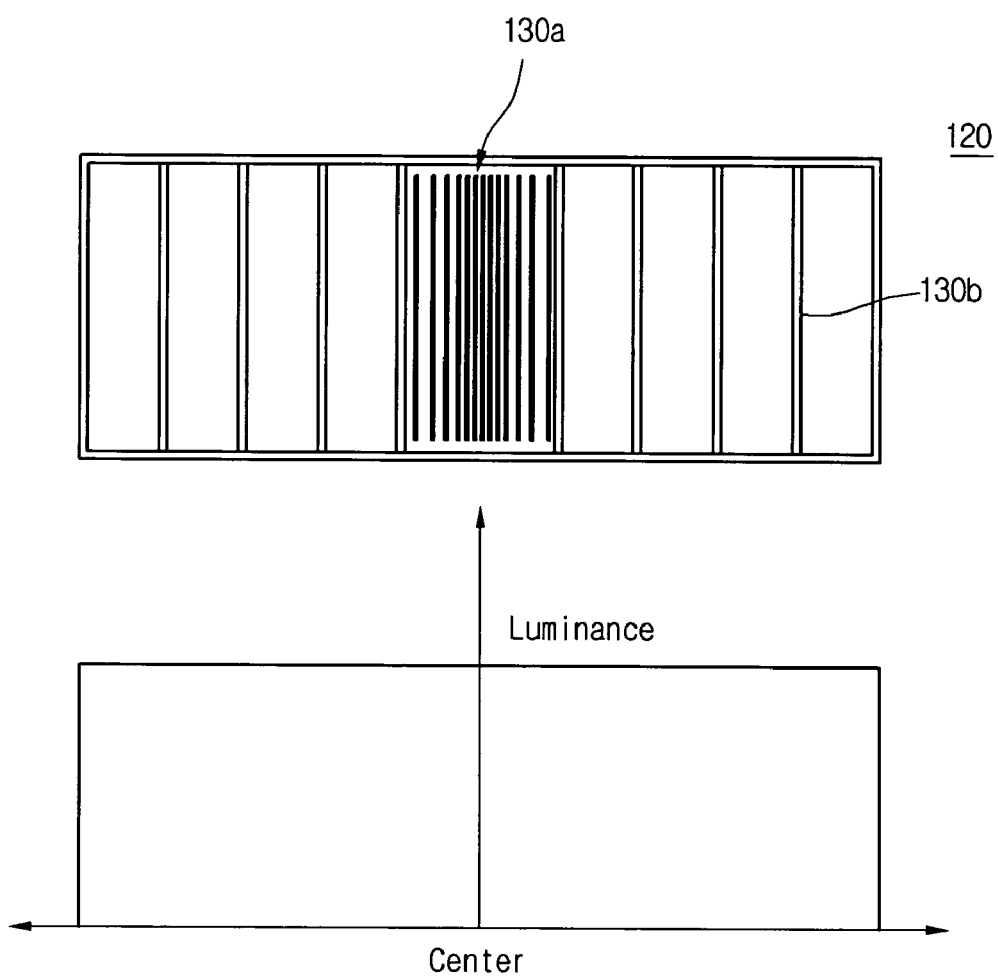
FIG. 5B is a front view of an optical guide module.

FIG. 5A is a view illustrating the traveling of light generated from the LED chip through the optical guide module and FIG. 5B is a front view of the optical guide module. As shown in FIGS. 5A and 5B, the light generated from the central area of the LED chip 111 is reflected, diffracted, and scattered by the slit bar 130a arranged on the central area of the optical guide module 120. Dotted arrows indicate directions where the light generated from the LED chip 111 is diffracted and propagated. Solid arrows indicates directions where the light generated from the LED chip 111 passes through spaces between the slit bar or travels according to the guide of the louver plates 130b.

Particularly, the light emitted from the LED chip 111 is effectively guided to both sides of the optical guide module 120 by the combination of the long and short louver plates 130b. That is, the long louver plates 130b disposed at the central area of the LED chip 111 guide the light generated from the central area of the LED chip 11 and from the area where the slit bar 130a are arranged to both side edges of the optical guide module 120.

Accordingly, the intensity of the light generated from the LED chip 111 can be uniform throughout the overall area of the optical guide module 120 when the light is emitted to the external side through the optical guide module 120.

The inclination of the louver plates 130b can be properly adjusted so that the light generated from the LED chip 111 can be effectively dispersed.

Therefore, the optical guide module 120 is designed to uniformly disperse the strong light generated from the central area of the LED chip 111 toward the both side ends, thereby emitting light having uniform luminance.

As shown in FIG. 5B, the slit bar 130a formed of bars are arranged at the central area of the LED chip 111 and the louver plates 130b are symmetrically arranged at left and right sides with reference to the slit bar 130a.

Figure 5C:
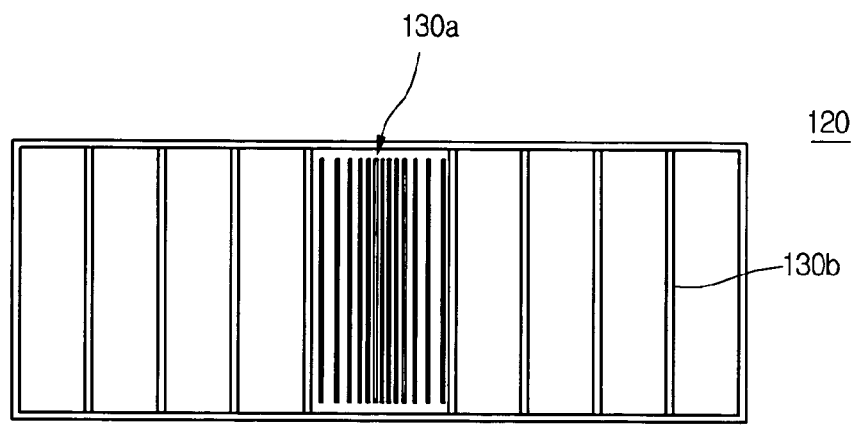
FIG. 5C is a view of a profile of light traveling from an LED chip through an optical guide module.

FIG. 5C shows a profile of light traveling from an LED chip 111 through an optical guide module 130. As illustrated a profile uniform along a first dimension may be obtained by the optical guide module 130.

Figure 6A:
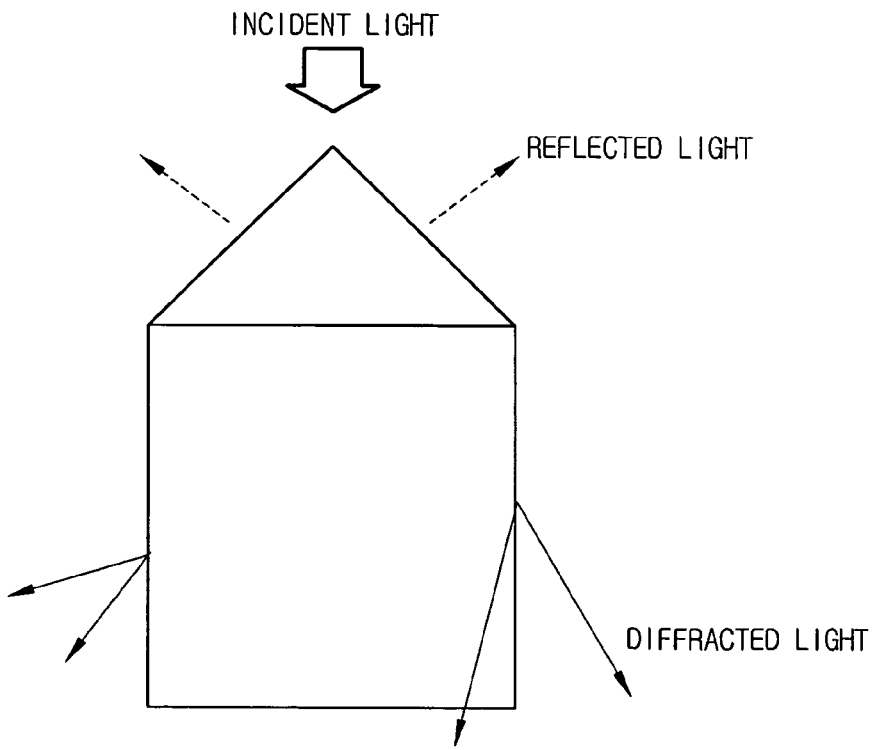
FIGS. 6A and 6B are views of a slit installed in an optical guide module, illustrating light traveling by the slit bar.
Figure 6B:
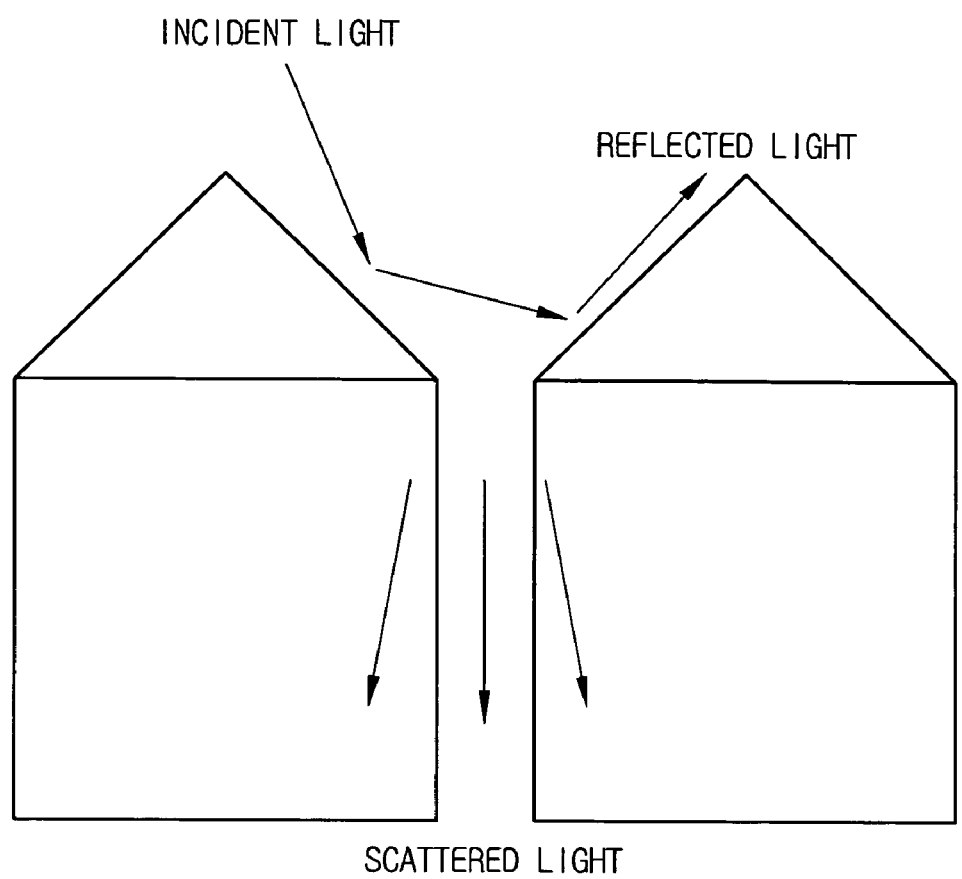

FIGS. 6A and 6B are views of the slit bar installed in the optical guide module, illustrating light propagating by the slit bar.

As shown in FIGS. 6A and 6B, each of the slit bar 130a arranged on the center of the optical guide module comprises a bar shape having a triangular cross-section. An upper portion of the slit bar 130a is triangular cone-shaped.

However, other shapes may be possible. Light reflection, scattering and diffraction where the slit bar comprises a bar shape having a triangular cross-section and an upper portion that is triangular cone-shaped will now be described.

The slit bar is arranged such that the triangular cone-shaped upper portion faces the LED chip to uniformly disperse the light generated from the LED chip by reflecting, diffracting and scattering the light.

The light emitted from the LED chip is reflected from the inclined surfaces of the triangular cone-shaped upper portion of the slit bar and diffracted from the side surfaces of the slit bar. Therefore, when the plurality of the slit bar are arranged at determined intervals, the light incident on the inclined surfaces of one slit bar is reflected to the inclined surfaces of the adjacent slit bar. The light reflected to the inclined surfaces of the adjacent slit bar is further reflected. Therefore, the light emitted from the LED chip is not directly transmitted through the slit bar.

In addition, the light is diffracted from the side surfaces of the slit bar, scattered and output between the slit bar, thereby emitting the light having a uniform luminance without generating the light spot.

Figure 7:
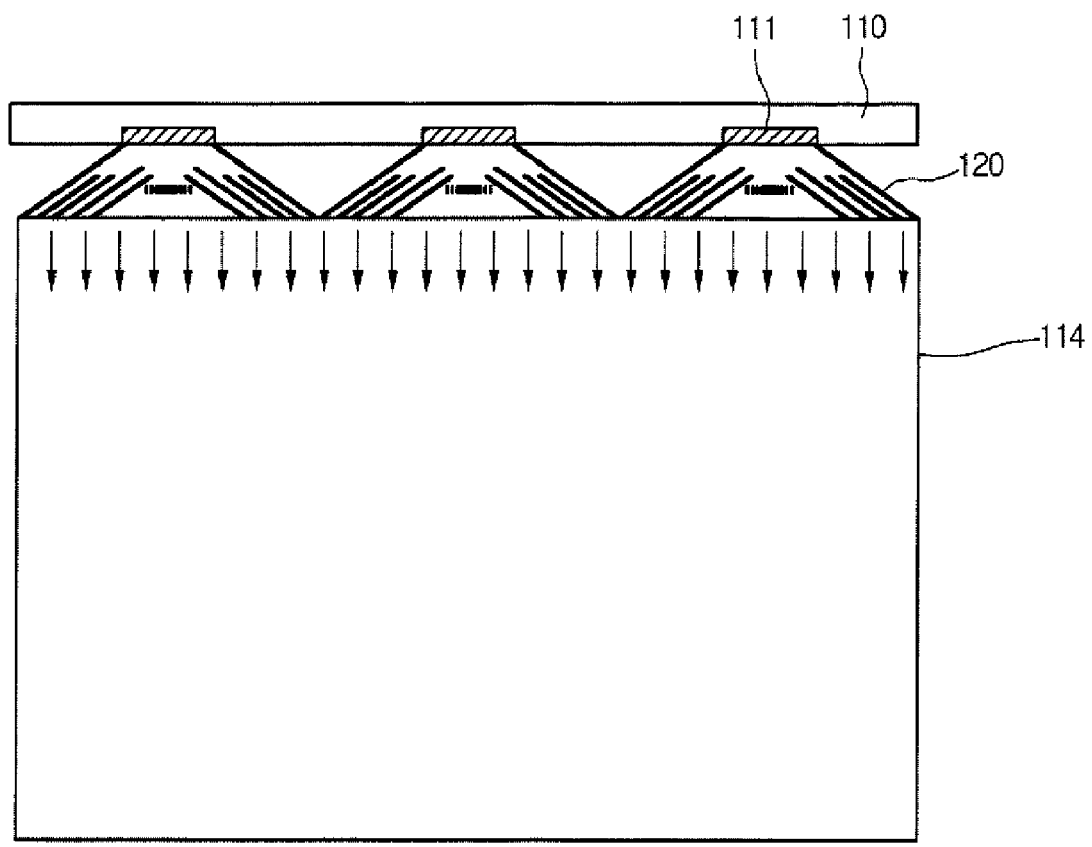
FIG. 7 is a view of light traveling at a backlight unit.

FIG. 7 is a view of light propagating at the backlight unit. As shown in FIG. 7, when the optical guide module 120 is applied to an edge-type LCD device, the circuit board 110 on which the LED chips 111 are mounted is disposed at a side or both sides of the light guide plate 114. The optical guide modules 120 are respectively provided in front of the LED chips 111. The light emission area of each optical guide module 120 contacts a light incident area of the light guide plate 114. Therefore, the light emitted from the optical guide modules 120 and having the uniform luminance can be fully incident on the light guide plate 114.

That is, the light emitted from the LED chips 111 is reflected, diffracted and scattered in the optical guide modules 114 and uniformly incident on the light guide plate 114, thereby solving the light spot problem.

Although a case where the optical guide module 120 is applied to the edge-type backlight assembly is illustrated above, the present disclosure is not limited to this case.

Figure 8A:
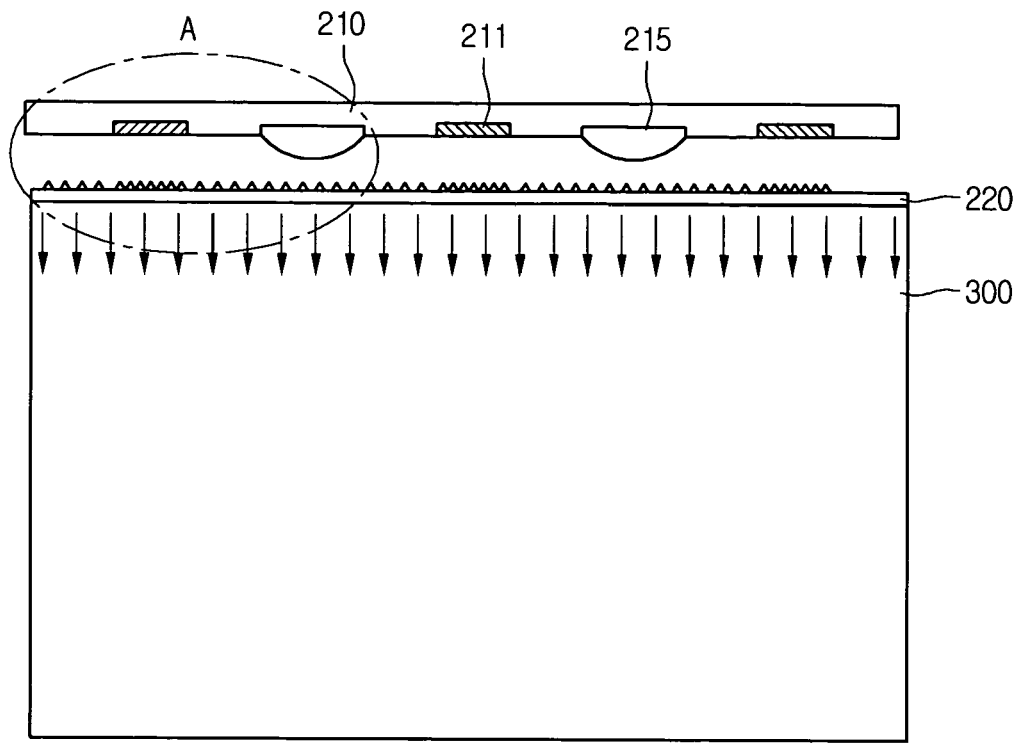
FIG. 8A is a view illustrating light traveling at a backlight unit and an optical guide module.
Figure 8B:
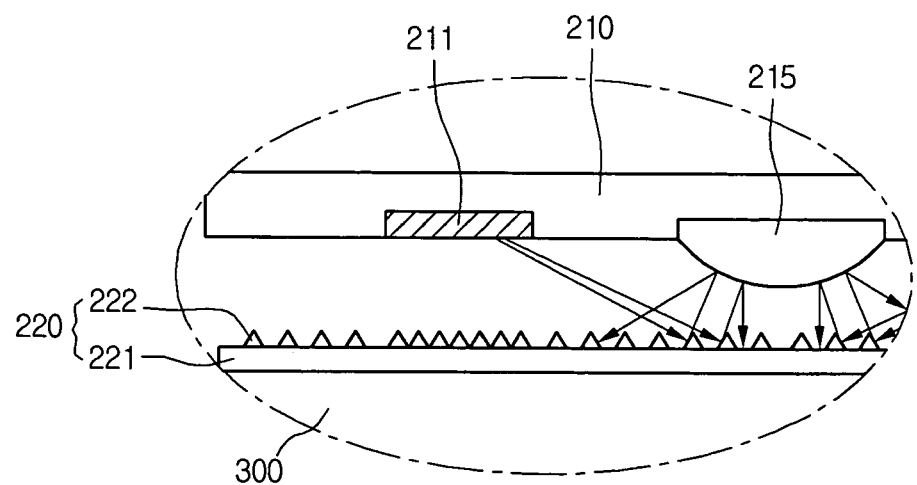
FIG. 8B is an enlarged view of a portion A of FIG. 8A.

FIG. 8A is a view illustrating light traveling at a backlight unit and an optical guide module and FIG. 8B is an enlarged view of a portion A of FIG. 8A.

As shown in FIGS. 8A and 8B, a circuit board 210 on which a plurality of LED chips 211 are mounted at determined intervals is disposed at a side or both sides of a light guide plate 300.

In addition, a reflective unit 215 is formed on the circuit board 210 between the LED chips 211. The reflective unit 215 may be one of a reflective coating layer and a reflective plate. The reflective unit 215 may be separately prepared and attached on the circuit board 210 or integrally formed with the reflective unit 215.

Since the reflective unit 215 guides the light leaking between the LED chips 211 to the light guide plate 300 by scattering and reflecting the light, thereby reducing the light loss.

An optical guide module is arranged at a light incident area of the light guide plate 300. The light guide module includes a slit bar plate 220 having a plate 221 and a plurality of slit bar 222 formed on the plate 222. Each of the slit bar is formed of a bar having a triangular section, circular section or an oval section.

The slit-bars 222 corresponding to the LED chips 211 are densely formed and the slit-bars 222 formed at both sides of the LED chips 211 are distantly formed.

This arrangement allows uniform emission of light. That is, the arrangement of the slits allows the light emitted from the central area of the LED chip 211 to be more diffracted, scattered and reflected while allowing the light emitted from an edge area of the LED chip 211 to be less reflected, scattered and diffracted, thereby emitting light having uniform luminance.

When the light emitted from the LED chips 211 passes through the slit bar plates 220 attached on the light incident portion of the light guide plate 300, the light is uniformly dispersed by the slit bar 222 and incident on the light guide plate 300, thereby preventing the light spot that may be caused by the non-uniform luminance in the conventional backlight assembly.

Figure 8C:
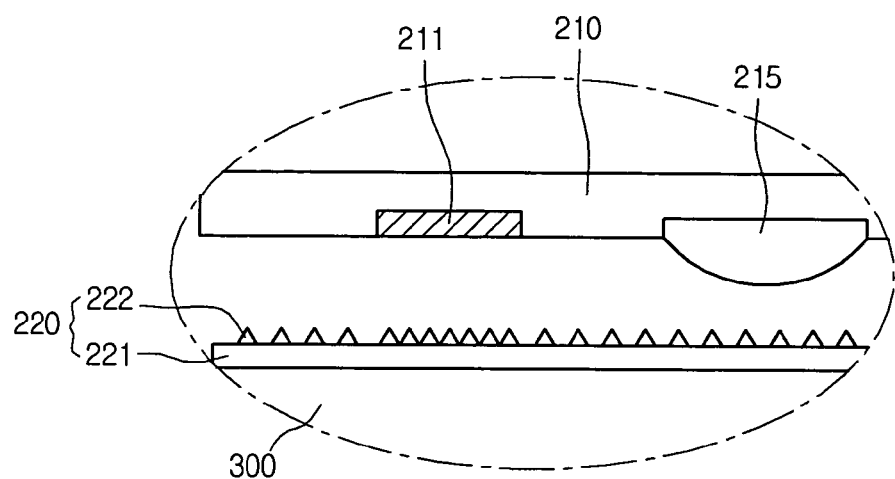
FIG. 8C is an enlarged view of a portion of FIG. 8B.

FIG. 8C is an enlarged view of a portion of FIG. 8B. FIG. 8C illustrates examples paths the light emitted from the LED chip 111 may take in scattering against the reflective unit 215 and the slit bar 222.

Figure 9A:
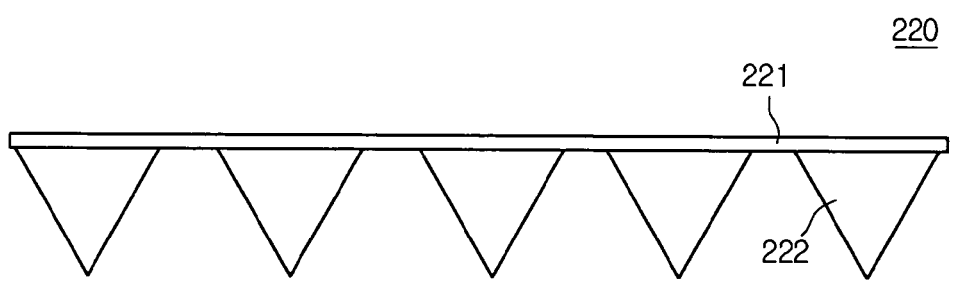
FIGS. 9A and 9B are views illustrating a light traveling principal and an optical guide module of FIG. 8A.
Figure 9B:
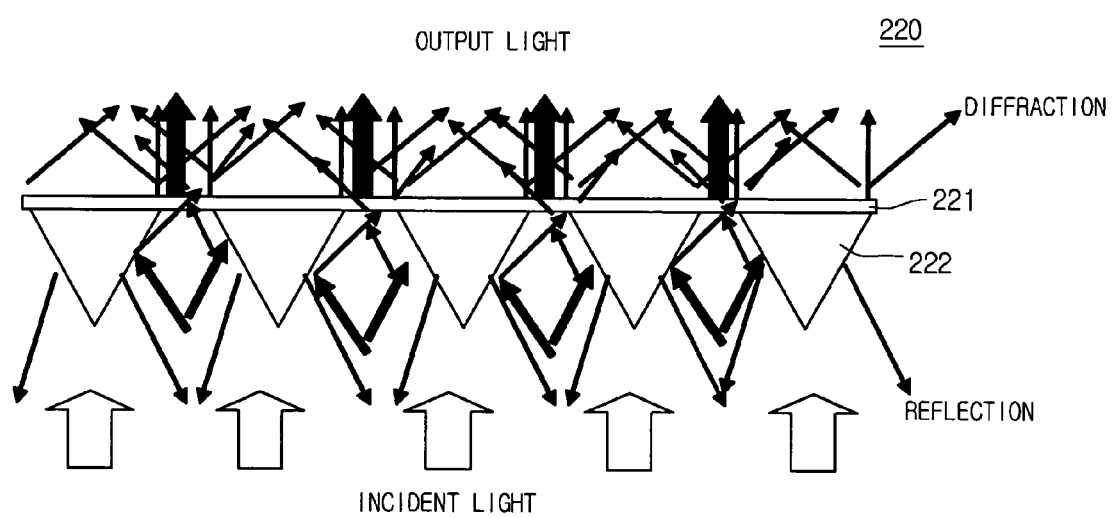

FIGS. 9A and 9B are views illustrating a light propagating in the optical guide module of FIG. 8A. As shown in FIGS. 9A and 9B, a slit bar plate 220 functioning as the optical guide module includes a plate 221 formed of polymethyl methacrylate (PMMA) and a plurality of slits 222 formed on the plate 221.

The slit bar 222 are formed of a variety of shapes. In this system, the slit bar 222 formed in a bar having a triangular section will be exampled.

The slit bar formed on the plate 221 are densely arranged at an area corresponding to the LED chips and spaced widely from each other at both sides of the LED chips.

The slit bar 222 are arranged such that the peaks thereof are oriented in a direction where the light is incident. Therefore, the light emitted from the LED chips is reflected, diffracted and scattered by the slit bar 222.

As shown in FIG. 9B, the light emitted from the LED chips is dispersed by being reflected and diffracted by the slit bar 222 of the slit bar plate 220. The dispersed light and the light passing between the slits 222 have a uniform luminance when it is emitted from the plate 221.

As described above, when the light generated from the LED chips travels toward the light incident area of the light guide plate, the light is to have a uniform luminance, thereby solving the light spot problem.

Figure 10A:
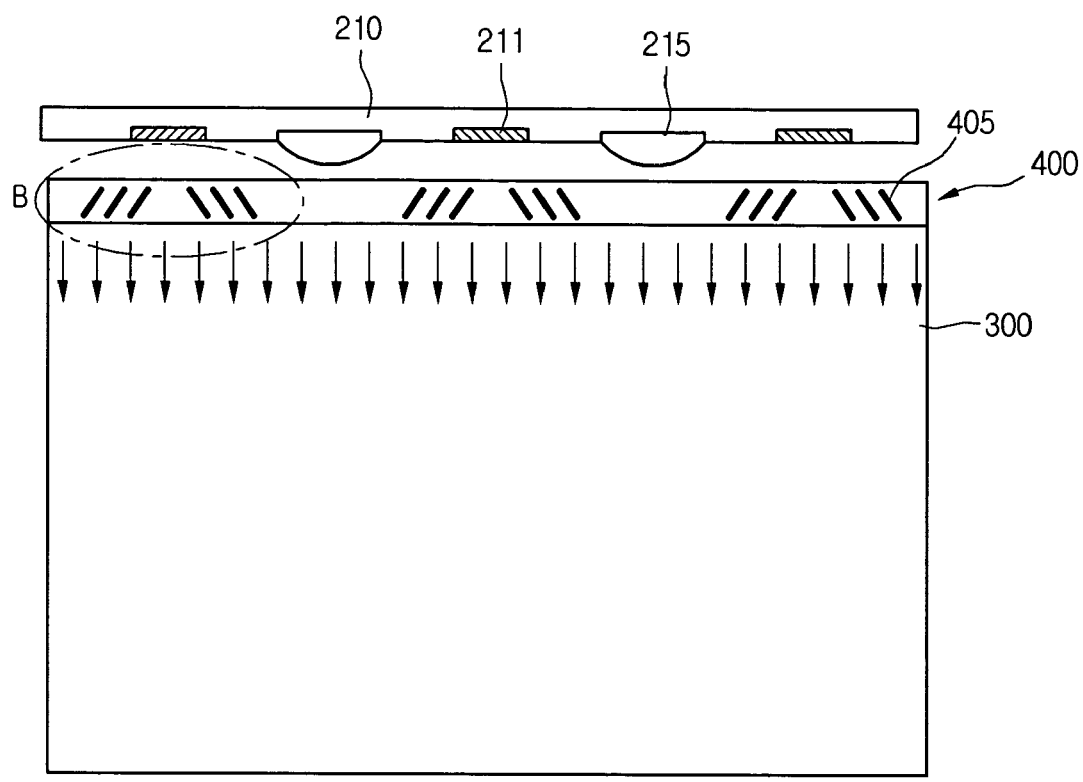
FIG. 10A is a view of a backlight unit having an optical guide module.
Figure 10B:
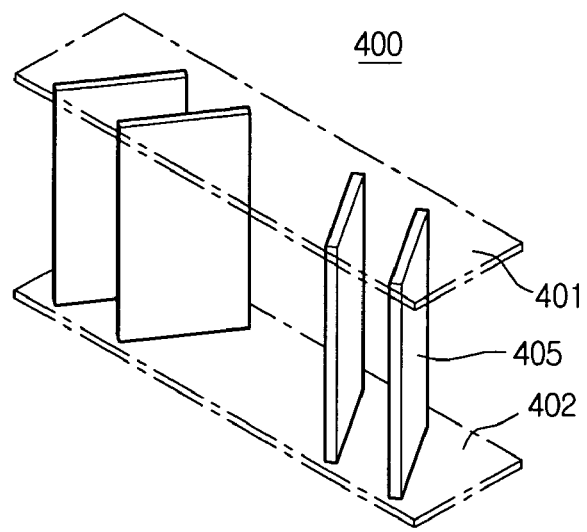
FIG. 10B is an enlarged view of a portion B of the optical guide module of FIG. 10A.

FIG. 10A is a view of a backlight unit having an optical guide module and FIG. 10B is an enlarged view of a portion B of the optical guide module of FIG. 10A.

As shown in FIGS. 10A and 10B, a circuit board 210 on which a plurality of LED chips 211 are mounted at determined intervals is disposed at a side or both sides of a light guide plate 300.

In addition, a reflective unit 215 is formed on the circuit board 210 between the LED chips 211. The reflective unit 215 may be one of a reflective coating layer and a reflective plate.

Since the reflective unit 215 guides the light leaking between the LED chips 211 to the light guide plate 300 by scattering and reflecting the light, thereby reducing the light loss.

An optical guide module 400 is disposed at a light incident area of the light guide plate 300. The light guide module includes a plurality of upper and lower plates 401 and 402 and a plurality of louver plates 405 disposed between the upper and lower plates 401 and 402.

The louver plates 405 are formed of a highly reflective material so that they can uniformly scatter the light emitted from the LED chips 211.

Therefore, two or more louver plates 405 are provided for one LED chip 211. That is, the number of louver plates 405 may be properly selected according to the louver condition. The inclination of the louver plate 405 can be properly set according to the degree of the light dispersion and light scattering.

In addition, since the optical guide module 400 is attached on the light incident area of the light guide plate 300, the light emitted from the LED chips 211 and the light reflected from the reflective unit 215 can have a uniform luminance property. That is, the louver plates 405 uniformly disperse the light generated from the LED chips 211, thereby preventing the light spot and making the light luminance uniform.

As described above, the light emitted from the optical guide module 400 and having the uniform luminance is incident on the light guide plate 300 and converted into the surface light having the uniform luminance.

Figure 10C:
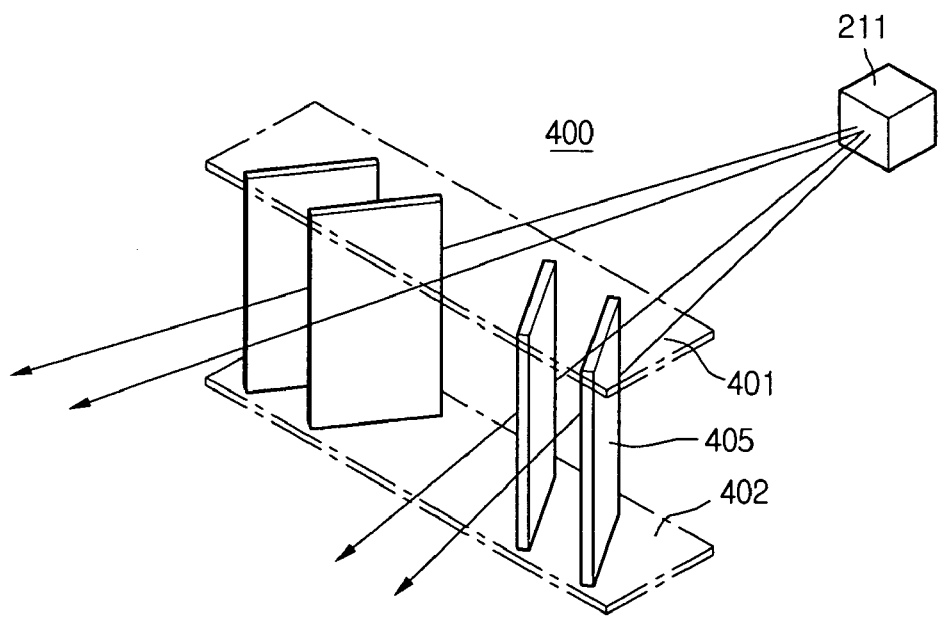
FIG. 10C is an enlarged view of a portion B of the optical guide module of FIG. 10A.

FIG. 10C is an enlarged view of a portion B of the optical guide module of FIG. 10A. As illustrated in FIG. 10C, light emitted from the LED chip 211 travels through the optical guide module 400 and is converted into the surface light having the uniform luminance.

The above described optical guide modules that can solve the non-uniform luminance problem can be applied to the edge-type backlight assembly as well as the direct-type backlight assembly.

Since the LEDs are used as the light source of the backlight unit, the power consumption can be reduced and the service life thereof can be increased. Furthermore, since the LED chips are mounted on the circuit board and the circuit board is disposed at a side of the light guide plate, the backlight unit can be used as the light source of the small display device.

In addition, since the optical guide module for uniformly guiding the light generated from the LED chip toward the light guide plate is disposed between the LED chip and the light guide plate, the light spot problem can be solved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit comprising:
   a circuit board;
   a plurality of light emitting diode (LED) chips on the circuit board;
   a light guide plate operative to convert light generated from the LED chips into surface light; and
   a plurality of optical guide modules corresponding to the respective LED chips and disposed between the plurality of LED chips and the light guide plate, wherein the plurality of optical guide modules further comprise a light scattering unit and a plurality of plates,
   wherein the plurality of plates comprises a plurality of louver plates and the plurality of light scattering elements comprises a plurality of slits,
   wherein the plurality of louver plates are symmetrically disposed with reference to the plurality of slits.

2. The backlight unit of claim 1, wherein each of the plurality of LED chips comprises red, green and blue LEDs.

3. The backlight unit of claim 1, wherein each of the plurality of LED chips comprises a white LED.

4. The backlight unit of claim 1, wherein the plurality of LED chips are mounted on a circuit board at determined intervals.

5. The backlight unit of claim 1, wherein the plurality of louver plates are inclined at a determined angle with reference to a centerline of an LED chip of the plurality of LED chips.

6. The backlight unit of claim 1, wherein each of the plurality of louver plates have different lengths from each other.

7. The backlight unit of claim 1, wherein distances between the slits disposed at an area corresponding to the plurality of LED chips are less than those between the plurality of slits disposed at other areas.

8. The backlight unit of claim 1, further comprising a reflective unit formed on the circuit board between the plurality of LED chips.

9. A backlight unit comprising:
   a circuit board;
   a plurality of light emitting diode (LED) chips on the circuit board;
   a light guide plate operative to convert light generated from the LED chips into surface light; and
   a plurality of optical guide modules corresponding to the respective LED chips and disposed between the plurality of LED chips and the light guide plate, wherein the plurality of optical guide modules further comprise a plurality of light scattering elements formed on a plate,
   wherein the plurality of light scattering elements comprises a plurality of slits and bars,
   wherein distances between the slits disposed at an area corresponding to the plurality of LED chips are less than those between the plurality of slits disposed at other areas.

10. The backlight unit of claim 9, wherein each of the plurality of LED chips comprises red, green and blue LEDs.

11. The backlight unit of claim 9, wherein each of the plurality of LED chips comprises a white LED.

12. The backlight unit of claim 9, wherein the plurality of LED chips are mounted on the circuit board at determined intervals.

13. The backlight unit of claim 9, further comprising a reflective unit formed on the circuit board between the plurality of LED chips.

14. A method of displaying in a liquid crystal device, the liquid crystal device comprising a circuit board, a plurality of light emitting diode (LED) chips on the circuit board, a light guide plate operative to convert light generated from the LED chips into surface light, and a plurality of optical guide modules corresponding to the respective LED chips and disposed between the plurality of LED chips and the light guide plate, the method comprising:
   arranging a circuit board operative to supply electric power to the plurality of LED chips at a light incident area of the light guide plate;
   mounting the plurality of LED chips on the circuit board at determined intervals;
   arranging the plurality of optical guide modules to enclose respective LED chips of the plurality of LED chips, wherein the plurality of optical guide modules include a plurality of light scattering elements and a plurality of plates, wherein the plurality of optical guide modules further comprise a plurality of slits and a plurality of louver plates, the method further comprising:

arranging the plurality of slits in front of the plurality of LED chips; and symmetrically arranging the plurality of louver plates with reference to the plurality of slits.

15. The method of claim 14, further comprising inclining the plurality of louver plates at a determined angle with reference to a centerline of an LED chip of the plurality of LED chips.

* * * * *